3,578,693
CYCLODISILAZANYLSILOXANES
Walter Fink, Zurich, Switzerland, assignor to
Monsanto Company, St. Louis, Mo.
No Drawing. Filed Dec. 6, 1968, Ser. No. 781,955
Int. Cl. C07f 7/02
U.S. Cl. 260—448.2         3 Claims

ABSTRACT OF THE DISCLOSURE

The invention relates to new compounds having the formula

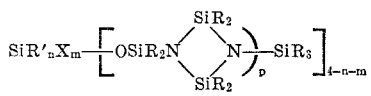

and

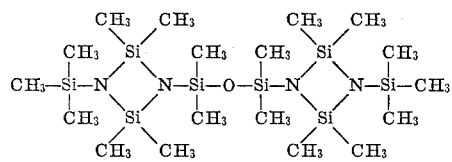

useful as temperature resistant functional fluids, such as heat transfer fluids, hydraulic fluids and lubricants.

---

The present invention relates to cyclodisilazanylsiloxanes of the general formula

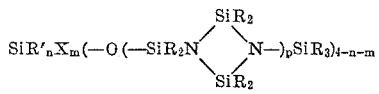

and to a process for preparing these compounds, in which R and R' signify identical or different, possibly substituted and/or ethylenically or acetylenically unsaturated hydrocarbon groups or heterocyclic groups, or partly hydrogen atoms, fluorine atoms or silyl groups, furthermore the organic groups and the silyl groups can also be attached to their silicon atom through an oxygen atom and the silyl groups can also be attached through a HN group, R''N group, where R'' is a hydrocarbon group, or through a divalent hydrocarbon group, two organic groups R or R' taken together with their silicon atom signify a heterocyclic group, X signifies a halogen atom, and $n$ and $m$ each signify 0, 1, 2 or 3 and total 3 at maximum, and $p$ is an integer of 1 to 6. The R groups, i.e. R, R', R'', R* and the like normally will not have more than 24 carbon atoms and in many cases not more than 8 carbon atoms.

The process is characterized in that a halosilane of the general formula $$SiR'_nX_{4-n}$$

in which R', X and $n$ have the same significance as above, is reacted with a metal derivative of a N-hydroxysilylcyclodisilazane of the general formula

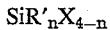

in which R has the same significance as above and M is a metal atom, especially an alkali metal.

The compounds showing the formula above can be prepared also according to other processes, for example, according to that of copending application Ser. No. 656,367, filed July 27, 1967 and now abandoned. However, the present process is especially expedient for the preparation of these compounds, since alkali metal derivatives of N-hydroxysilylcyclodisilazanes now are easily available.

Compounds of the above formula where $n+m=0$, 1 or 2, i.e. end products containing up to four cyclodisilazane units linked via siloxane bridges can also be obtained according to the process of invention.

These compounds which have not been known till now can be illustrated as follows

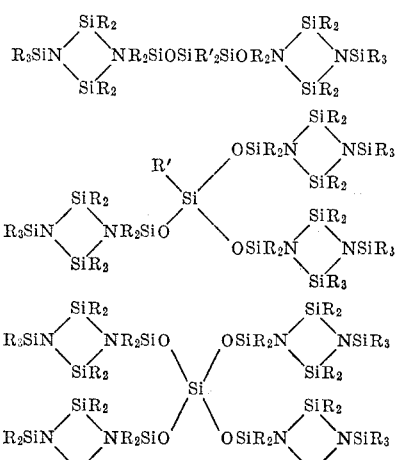

These compounds show no reactive halogen atom because of the ratio of the reactants and possess a particular significance as end product. As a rule, they are high temperature resistant liquids being superior to the well known siloxanes (silicones) since their thermal resistance is better and at about the same molecular weight their boiling points are higher. Thus, the novel compounds are generally useful where high temperature resistant liquids will be required such as heat transfer fluids, hydraulic fluids, lubricants and so on.

The process of invention proceeds according to the equation (a)

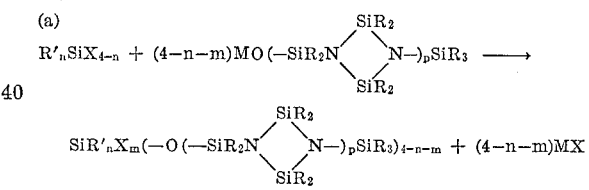

Depending on the number of reactive halogen atoms in the starting halosilanes and depending on the ratio of the reactants employed, products can also be obtained which still contain up to three reactive halogen atoms attached to a silicon atom. Such products are valuable intermediates, since the halogen atoms can be exchanged in usual manner for, e.g., hydrocarbon groups, heterocyclic groups, alkoxy groups, phenoxy groups, fluorine atoms and so on.

Especially valuable products are obtained by reacting the halogen compound with alkali silanolates such as, e.g., sodium trimethylsilanolate, sodium triphenylsilanolate, potassium diphenylmethylsilanolate, potassium pentamethyldisiloxanolate, sodium 1,2 - diphenyltrimethyldisiloxanolate and sodium pentaphenylcyclotrisiloxanolate.

A large number of the starting halosilanes necessary according to Equation (a) are known. Any silicon compound possessing on a silicon atom at least one reactive halogen atom is utilizable in the instant process.

As reactive halogen atoms are considered chlorine atoms, bromine atoms and iodine atoms. Fluorine atoms in many cases are less or not at all reactive. In general, the technically available chlorosilanes will here be preferred. Some well known and utilizable halosilanes are cited as follows in order to show the possibilities of combinations regarding the groups R': dichlorodihydrogenosilane, trimethylchlorosilane, dimethylchlorohydrogenosilane, diphenyldichlorosilane, phenyldihydrogenochlorosilane, dimethylphenylchlorosilane, methylfluorodichlorosilane, phenylhydrogenfluorochlorosilane. Examples where two organic groups R' on the same silicon atom which form together with their silicon atom a heterocyclic group are: 1,1-dichlorosilacyclobutane, 1,1-dichlorosilacyclopentane, 1 - methyl - 1 - chlorosilicacyclopentane, 1 - phenyl - 1 - chlorosilacyclohexane, 1-phenyl-1-chlorosilacyclohexene-(2).

Some well known examples of substituted organic halosilanes are: pentafluoroethyl - methyldichlorosilane, 3,3,3-trifluoro - n - propyldichlorohydrogenosilane, tetrafluoro-2-chloroethyl - trichlorosilane, 1,2-dichlorovinyl-trichlorosilane, p-chlorophenylvinyldichlorosilane, bis - (p-fluorophenyl) - dichlorosilane, bis - (3,5 - dibromophenyl)-methylchlorosilane, tris - [(3,5 - bis - trifluoromethyl)-phenyl] - chlorosilane, p - methoxyphenyltrichlorosilane, 2 - methoxy - 5 - bromophenyltrichlorosilane, phenoxyphenylpropyltrichlorosilane, p - dimethylaminophenyl-methyldichlorosilane, methyl - β - cyanoethyldichlorosilane, tris-(acetylacetonyl) - chlorosilane, bis-(2-pyridyl)-dichlorosilane, 1,4,5,6 - tetrachloro - 7 - fluorobicyclo-[2,2,1] hept - 5 - ene-2-hydrodichlorosilane, di - (tert-butylthio-(hydrogenochlorosilane, 1-fluoro - 2 - chloro - 1, 2,2 - trimethyldisilane, trimethylsilyldichlorohydrogenosilymethane, pentaethylchlorodisiloxane, 1,1,1 - triphenyl-hydrogenodichlorodisiloxane, 1,1,1 - triphenyl - methyl-hydrogenochlorodisiloxane, and bis - (triphenyl - siloxy)-hydrogenochlorosilane.

The groups R and R' can also be silyl groups. The term "silyl groups" should be conceived herein in the broadest sense and comprise at least the groupings $SiR^*_3$, $SiR^*_2SiR^*_3$, $SiR^*_2OSiR^*_3$, $Si(SiR^*_3)_3$, $Si(SiR^*_3)_2R^*$, $Si(OSiR^*_3)_3$, $Si(OSiR^*_3)_2R^*$, $SiR^*_2NHSiR^*_3$, $$Si(NHSiR^*_3)_2R^*$$

and $Si(NHSiR^*_3)_3$ in which R* signifies a hydrogen atom, halogen atom and/or organic group possibly attached via an oxygen atom.

Examples of some silyl groups of the general formula $SiR^*_3$ are: trimethylsilyl, triphenylsilyl, trimethoxysilyl, triphenoxysilyl, dimethoxy-phenoxysilyl, methoxy-diphenoxysilyl, methyldimethoxysilyl, dimethyl-methoxysilyl, phenyl - dimethoxysilyl, methyl - diphenoxysilyl, methyl-phenyl - methoxysilyl, methyl - phenyl - phenoxysilyl etc. including silyl groups in which Si is a constituent of a heterocycle such as in the groups silacyclopentenyl, silacyclohexyl, silacyclohexenyl, silacyclohexadienyl, etc., also, fluorosilyl groups like trifluorosilyl, methyldifluorosilyl, dimethylfluorosilyl, phenyldifluorosilyl, diphenylfluorosilyl, methyl-phenylfluorosilyl, methoxydifluorosilyl, dimethoxyfluorosilyl, methoxyphenoxyfluorosilyl, methoxyphenylfluorosilyl, phenoxymethylfluorosilyl etc., moreover, hydrogenosilyl groups like trihydrogenosilyl, methyldihydrogenosilyl, dimethylhydrogenosilyl, phenyldihydrogenosilyl, diphenyldihydrogenosilyl, methyl-phenylhydrogenosilyl, methoxydihydrogenosilyl, dimethoxyhydrogenosilyl, phenoxydihydrogenosilyl, diphenoxyhydrogenosilyl, methoxy - phenoxyhydrogenosilyl, methoxy-phenylhydrogenosilyl, phenylfluorohydrogenosilyl etc. Other analogous silyl groups contain other organic groups such as have been enumerated for R instead of methyl, phenyl, methoxy or phenoxy.

The simplest representatives of substituents having Si—Si or Si—O—Si bonds are:

Pentamethyldisilanyl, 1 - trimethylsilyl - tetramethyldisilanyl, 1-bis - (trimethylsilyl) - trimethyldisilanyl, pentamethoxydisilanyl, pentamethoxydisiloxanyl, 1-trimethoxysilyl - tetramethoxydisiloxanyl and 1 - bis - (trimethoxysilyl) - trimethoxydisiloxanyl. Analogous substituents contain, possibly partly, other organic groups R, hydrogen atoms or fluorine atoms instead of methyl.

Some simple representatives of silyl groups linked through a nitrogen atom are:

Trifluorosilylamino, trifluorosilylmethylamino, bis-(trimethylsilyl) amino, trimethoxysilylamino, trimethoxysilylmethylamino, bis - (trimethoxysilyl) amino, triphenylsilylamino, methyldiphenylsilylamino, bis - (dimethylphenylsilyl)amino, pentamethyldisilanylamino, pentamethyldisilazanylamino, pentamethyldisiloxanylamino, pentamethoxydisilanylamino, pentamethoxydisilazanylamino and pentamethoxydisiloxanylamino.

The enumerated silyl groups all can be linked via an oxygen atom, HN group, NR'' group, where R'' signifies a hydrocarbon group, and also via a divalent hydrocarbon group, instead of being linked directly via their silicon atom.

Especially valuable products distinguished by their great thermal and hydrolytic resistance and showing a broad liquid range, or intermediary products suitable for the preparation of such products, contain at least one diaryl ether grouping [ArOAr], and can be derived, for example from one of the following compounds:

Phenoxybenzene, toloxybenzene, 2-biphenylether, 3-biphenylether, 4 - biphenylether, 2 - biphenylyl-4-biphenylether, 3-biphenylyl - 4 - biphenylylether, 1-(2-biphenylyloxy)-4-phenoxybenzene, 1-(3-biphenylyloxy)-2-phenoxybenzene, 1-(3-biphenylyloxy)-3-phenoxybenzol, 1-(3-biphenylyloxy) - 4 - phenoxybenzol, 1-(4-biphenylyloxy)-2-phenoxybenzene, 1-(4-biphenylyloxy)-3-phenoxybenzene, 1-(4-biphenylyloxy)-4-phenoxybenzene, 2,2'-diphenoxybiphenyl, 3,3'-diphenoxybiphenyl, 4,4'-diphenoxybiphenyl, 2,3'-diphenoxybiphenyl, 2,4'-diphenoxybiphenyl, 3,4'-diphenoxybiphenyl, 2,4-diphenoxybiphenyl 2,5-diphenoxybiphenyl, 2,6-diphenoxybiphenyl, 3,4-diphenoxybiphenyl, 3,5-diphenoxybiphenyl, 1,2,3-triphenoxybenzene, 1,2,4-triphenoxybenzene, 1,3,5 - triphenoxybenzene, 2 - phenoxyphenylether, 3-phenoxyphenylether, 4-phenoxyphenylether, 2-phenoxyphenyl-3-phenoxyphenylether, 2-phenoxy-4'-phenoxyphenylether, 3-phenoxyphenyl-4'-phenoxyphenylether, 1-phenoxynaphthalene, 2-phenoxynaphthalene, 1,1'-dinaphthalene-ether, 2,2'-dinaphthalene-ether, 1,2'-dinaphthalene-ether etc.; moreover longer chain polyaroxyaryls of the formula $ArO(ArO)_b$ in which Ar represents a phenyl, biphenylyl or naphthyl group, or a phenylene, biphenylylene or naphthylene group, which can have lower alkyl groups as substituents, and b represents an integer of 1 to 10.

The above enumerated ether can be attached to the silicon atom through one of their carbon atoms or through an oxygen atom. Moreover, one or more hydrogen atoms can be replaced by fluorine atoms, whereby the liquid range of the end products can be increased.

The second reactants necessary according to Equation (a) are metal derivatives of N-hydroxysilyl cyclodisilazanes. The same organic groups can be used as enumerated above for R' and these groups R can also be partly hydrogen atoms, fluorine atoms or silyl groups, since the original precursors also are halosilanes. To those skilled in the art it is clear that in the N-hydroxysilyl-cyclodisilazanes the substituents R will not be exclusively hydrogen atoms, fluorine atoms or silyl groups, but will occur in the same compound simultaneously together with organic groups, either in a same silyl group or in another silyl group of a same compound. The term "partly" should be interpreted as just explained.

The preparation of the N-hydroxysilyl-cyclodisilazane is accomplished with the corresponding N-halosilyl-cyclodisilazane according to the equation.

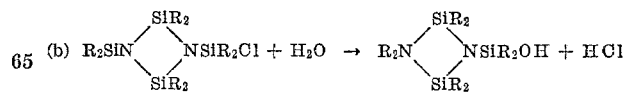

This reaction must be carried out in the presence of an acid-binding agent, so that the reaction milieu does not contain free acid. Suitable acid-binding agents are, e.g., tertiary amines like trimethyl amine, triethyl amine and so on. The halide is conveniently added to the alkaline or basic aqueous solution. Alkali salts will be preferred in the reaction according to Equation (b). These are obtainable in known manner by reacting the hydroxyl compound with, e.g. butyl lithium, sodium hydride or potassium hydride.

The reation of invention according to Equation (a) proceeds at room temperature. It is desirable to subsequently heat the reaction mixture at a higher temperature for some time. The reaction can be carried out with or without a solvent. The presence of an inert solvent, e.g. hexane, is favorable for the removal of the byproduct alkali salts. The end products are sensitive towards hydrolysis if they contain reactive halogen atoms and therefore moisture should be excluded.

EXAMPLE 1

18.6 g. (0.062 mole) of N-dimethyl-lithiumoxysilyl-N'-trimethylsilyltetramethylcyclodisilazane and excess dimethyldichlorosilane are stirred at room temperature for 5 hours and subsequently at 50° for 3 hours. Excess dimethyldichlorosilane is distilled off under vacuum. Hexane and charcoal are added to the pulpy residue and the lithium chloride is filtered off, using CELLIT. The solvent is distilled off and the residue is fractionally distilled. Yield 19.8 (82.5%); B.P. 132° C./14 mm., $n_D^{20}$ 1.435.

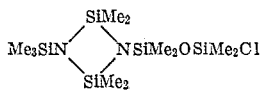

(Me=CH$_3$)

Calcd. for $C_{11}H_{33}ON_2Si_5Cl$ (percent): C, 34.29; H, 8.63, N, 7.27, Cl, 9.20. Found (percent): C, 34.18; H, 8.56, N, 7.20, Cl, 9.45.

In the preparation of the starting compound, 8.4 g. (0.027 mole) of N-dimethyl-chlorosilyl-N'-trimethylsilyl-tetramethylcyclodisilazane, dissolved in 20 ml. of hexane, are added dropwise to a mixture of 100 ml. of diethyl amine and 30 ml. of water. After stirring for 15 minutes it is extracted by shaking with water and the amine and solvent are distilled off at 30–50° C. The crystalline residue in the flask is 100% pure according to the NMR spectrum.

Yield 7.82 g. (98.9%, M.P. 56° C.).

Calcd. for $C_9H_{28}ON_2Si_4$ (percent): C, 36.93; H, 9.64; N, 9.57. (Mol. weight 292.7.) Found (percent): C, 36.91; H, 9.54; N, 9.53. (Mol weight 291.)

The lithium salt of this compound is obtained by reacting the silanol with an equimolar amount of butyl lithium. To 13.6 g. (0.047 mole) of silanol, dissolved in 100 ml. of hexane, are added dropwise 31 ml. of 1.53-normal solution of butyl lithium with stirring. The solvent is removed in vacuo and the remaining dried at about 40° C.

Yield 14.5 g. (100%); decomposition point about 100° C.

Calcd. for $C_9H_{27}ON_2Si_4Li$ (percent): C, 36.20; H, 9.13; N, 9.38. Found (percent): C, 36.02; H, 8.86; N, 8.86.

EXAMPLE 2

11.0 g. (0.035 mole) of N-dimethylchlorosilyl-N'-trimethylsilyltetramethylcyclodisilazane are refluxed and 11.0 g. (0.035 mole) of N-dimethyl-lithiumoxysilyl-N'-trimethylsilyltetramethylcyclodisilazane are added. After refluxing for 5 minutes the mixture is cooled, hexane is added and the lithium chloride is filtered off. The filtrate is concentrated and fractionally distilled.

Yield 18.3 g. (91.4%); B.P. 125° C./0.04 mm., $n_D^{20}$ 1.4462.

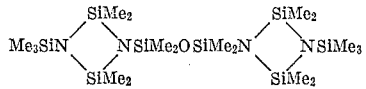

(Me=CH$_3$)

Calcd for $C_{18}H_{54}ON_4Si_8$ (percent): C, 38.10; H, 9.59; N, 9.87. (M.W. 567.4.) Found (percent): C, 38.55; H, 9.24; N, 9.95. (M.W. 563.)

What I claim is:

1. A cyclodisilazanylsiloxane of the formula

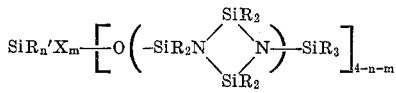

wherein R and R' represent the same or different hydrocarbon radicals containing less than 8 carbon atoms, X represents a halogen atom, and each of $n$ and $m$ represents 0, 1, 2 or 3 provided the sum of $n$ and $m$ is not greater than 3.

2. A cyclodisilazanylsiloxane of the formula

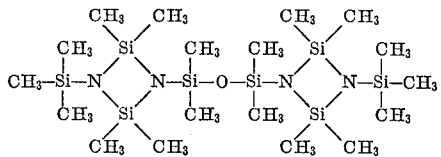

3. A cyclodisilazanylsiloxane of the formula

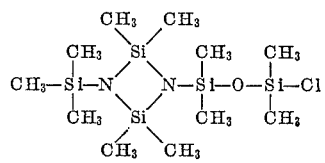

References Cited

UNITED STATES PATENTS

| | | | |
|---|---|---|---|
| 3,422,060 | 1/1969 | Fink | 260—448.2X |
| 3,468,922 | 9/1969 | Fink | 260—448.2 |
| 3,453,306 | 7/1969 | Selin | 260—448.2 |

OTHER REFERENCES

Bazant et al.: Organosilicon Compounds (1965), p. 46, QD 412 S6 B3.

TOBIAS E. LEVOW, Primary Examiner

W. F. W. BELLAMY, Assistant Examiner